Dec. 8, 1964  F. P. ALBERT ETAL  3,159,911
METHOD OF MAKING CYLINDERS
Filed April 4, 1962  3 Sheets-Sheet 1
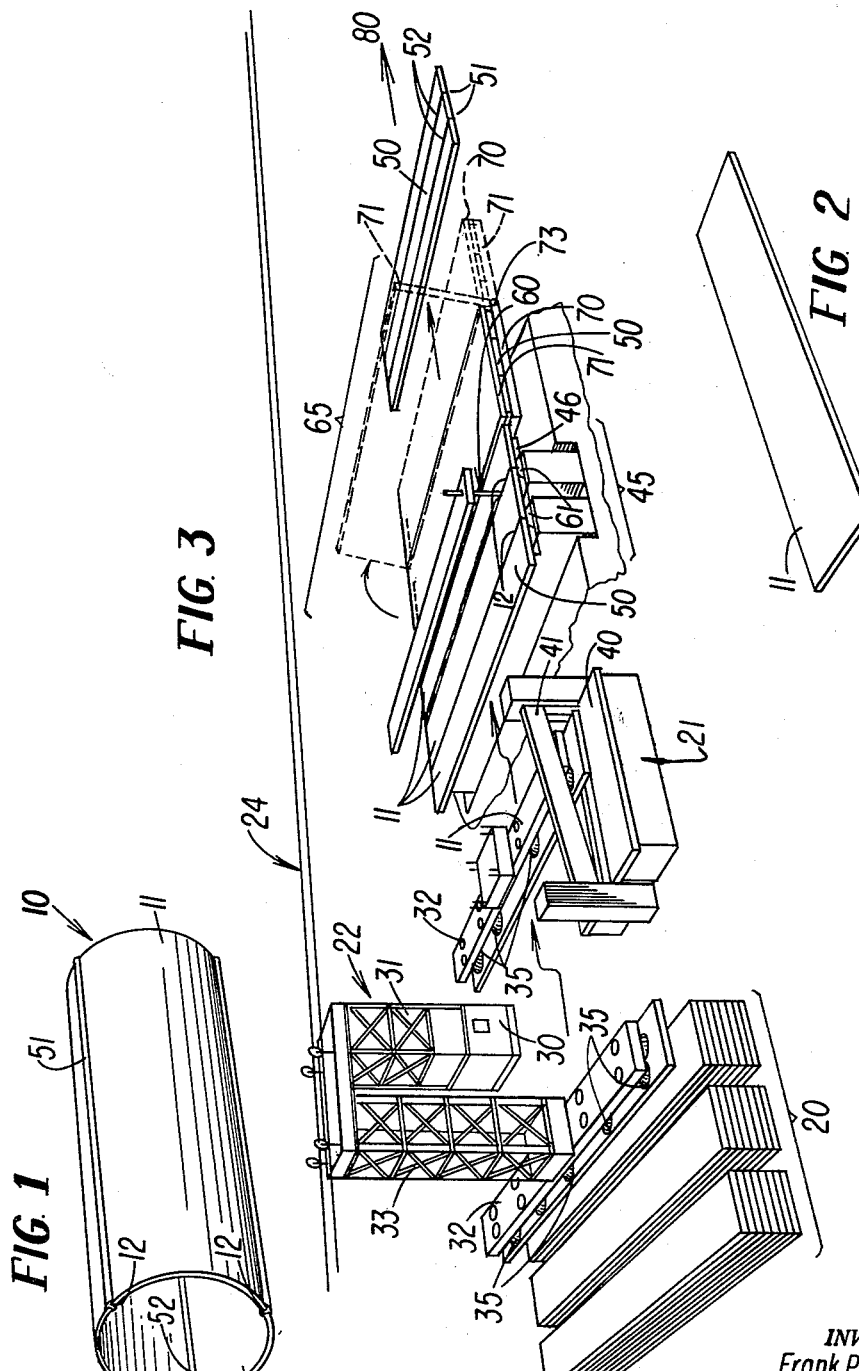
INVENTORS
Frank P. Albert
Lawrence W. Bieker
Alvin A. Bowcutt
BY

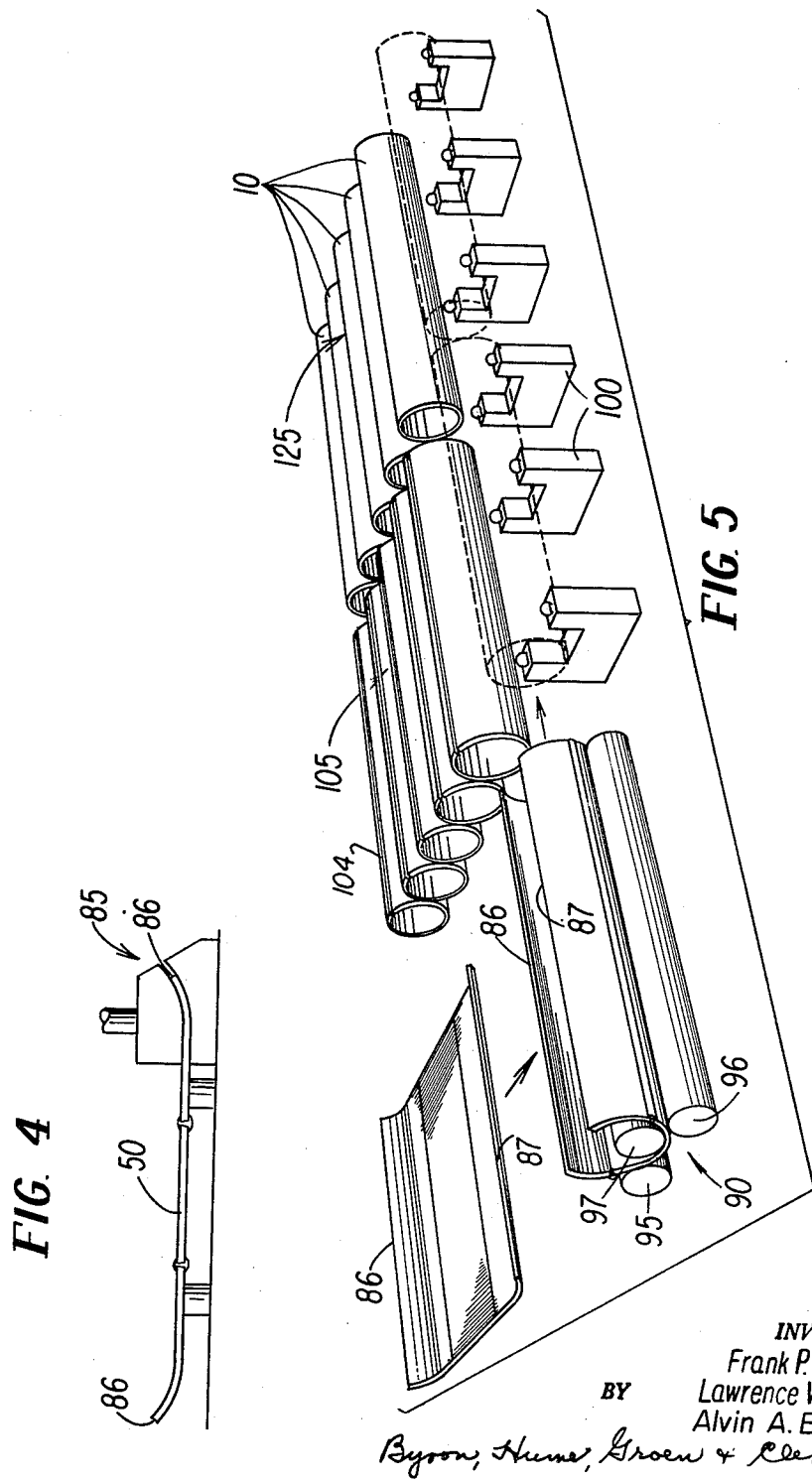

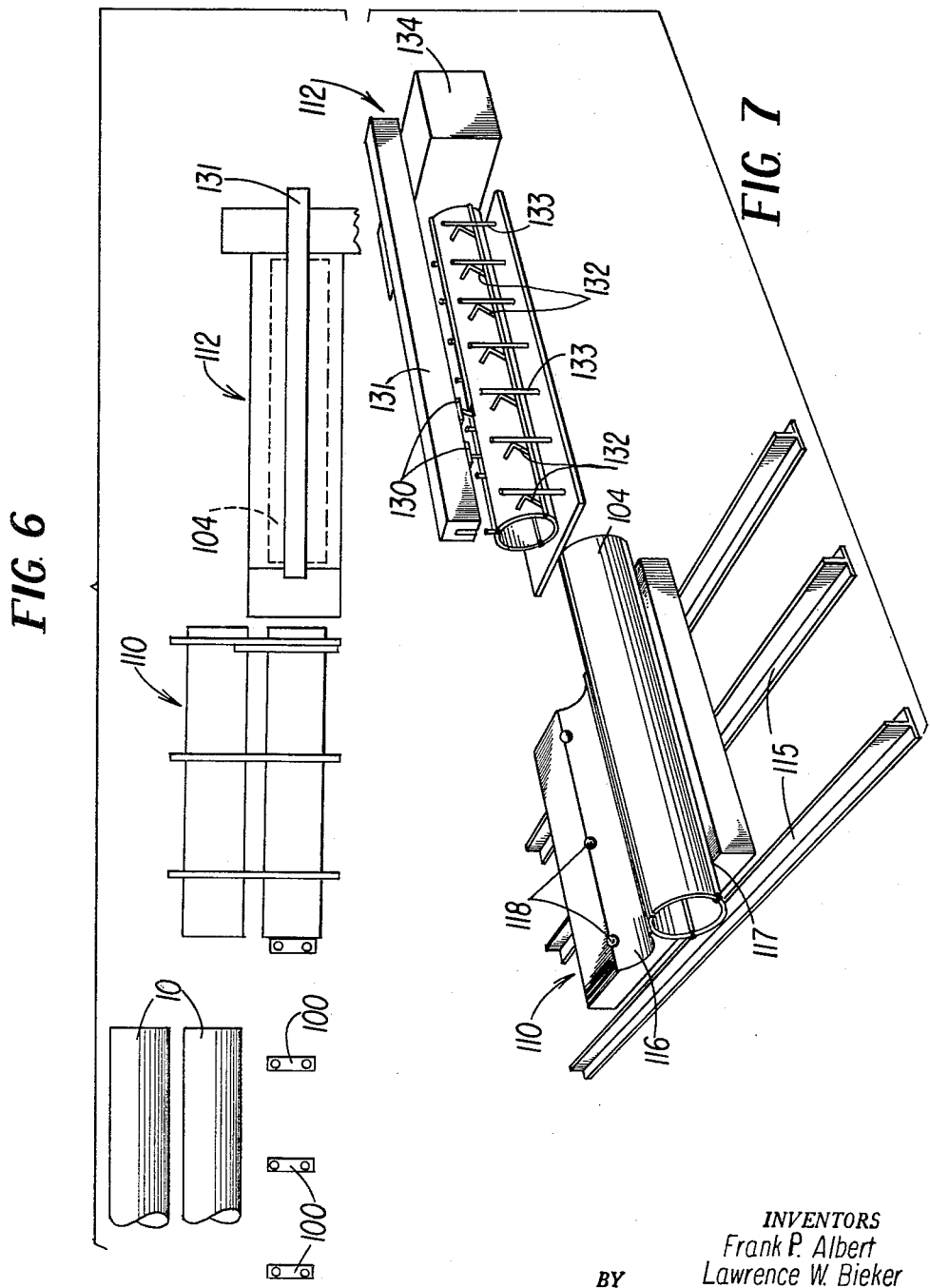

United States Patent Office 3,159,911
Patented Dec. 8, 1964

3,159,911
METHOD OF MAKING CYLINDERS
Frank P. Albert, Lansing, Ill., Lawrence W. Bieker, Munster, Ind., and Alvin A. Bowcutt, Park Forest, Ill., assignors to Union Tank Car Company, Chicago, Ill., a corporation of New Jersey
Filed Apr. 4, 1962, Ser. No. 184,982
4 Claims. (Cl. 29—471.1)

This invention relates in general to cylinder construction. It deals more particularly with a method of manufacturing cylinders.

It is an object of the present invention to provide a new and improved method for manufacturing cylinders.

It is another object to provide a new and improved method of manufacturing large diameter cylinders.

It is still another object to provide a new and improved method of manufacturing a cylinder from a plurality of substantially flat plates.

It is yet another object to provide a new and improved method of manufacturing a cylinder wherein a plurality of substantially flat plates are welded together and the resultant composite plate is subsequently rolled into cylindrical form.

It is a further object to provide a method of the aforedescribed character wherein the weld beads developed on the side of the composite plate defining the inside of the cylinder are substantially small so as to obviate distortion of any cylinder lining subsequently applied.

It is yet a further object to provide a method of the aforedescribed character wherein the cylinders which are manufactured develop substantially lower weld bead stresses than generally similar cylinders presently known, when subjected to heavy strains.

It is still a further object to provide a method of the aforedescribed character wherein the cylinders which are manufactured are more uniformly round than cylinders manufactured by methods presently known.

It is another object to proivde a simpler, faster, and less expensive method of manufacturing cylinders.

The above and other objects are realized in accordance with the present invention by providing a new and improved method of manufacturing cylinders. The invention contemplates fashioning a plurality of flat metal plates which are then placed on a flat surface in immediately adjoining relationship and the seams defined between the plates welded from one side of the plates. The resultant welds are such that relatively large beads are defined along each seam on one surface of the composite plate and relatively small beads are defined along each seam on the opposite side of the plate.

Each longitudinally extending free edge of the composite plate is then crimped into an arc having a radius corresponding to the proposed radius of curvature of the finished cylinder. The composite plate is subsequently rolled into cylindrical form wherein its longitudinally extending free edges come into immediately adjacent relationship. In one aspect of the invention the side of the composite plate bearing the larger weld beads comprises the outer surface of the newly formed cylinder.

The open seam defined by the longitudinally extending adjacent free edges of the composite plate is welded from the outside of the cylinder. As a matter of choice, the inside of the cylinder might then be coated with a lining such as concrete or the like, to assure optimum fluid transporting characteristics, for example.

The invention, both as to its organization and method of operation, taken with further objects and advantages thereof, will best be understood by reference to the following description taken in connection with the accompanying drawings, in which:

FIGURE 1 is a perspective view of a finished cylinder, manufactured by the method embodying the features of the present invention;

FIGURE 2 is a perspective view of a substantially flat component plate utilized in the manufacture of the cylinder shown in FIGURE 1;

FIGURE 3 is a diagrammatic perspective view illustrating the initial sequence of operations embodied in the above-referred method including the assembly and welding of a composite plate from a series of component plates;

FIGURE 4 is a diagrammatic end elevational view of the next operation in the method wherein each of the longitudinally extending free edges of a welded composite plate is crimped;

FIGURE 5 is a diagrammatic perspective view illustrating the next sequence of operations wherein the crimped composite plate is rolled into cylindrical form and the unfinished cylinder is moved into a storage area;

FIGURE 6 is a diagrammatic plan view illustrating the next sequence of operations wherein the unfinished cylinders are moved from the storage area onto a finish seamer (welder) for final welding and then removed from the seamer and returned to a finished cylinder storage area; and FIGURE 7 is a diagrammatic perspective view of a portion of the sequence of operations illustrated in FIGURE 6 showing an unfinished cylinder being transferred from the storage area to the finish seamer and another cylinder seated in the finish seamer as it is finish welded.

Referring now to the drawings and particularly to FIGURE 1, a cylinder constructed by the method embodying the features of the present invention is illustrated generally at 10. The cylinder comprises three substantially identical plates 11 welded together along seams 12 formed between their longitudinally extending edges. The cylinder 10, if it is to find ultimate use as an aqueduct pipe, for example, is preferably lined with concrete or the like. It will be understood, however, that these cylinders 10 might be used in the construction of tank shells, penstocks, etc., as well.

It is considered common practice to manufacture large diameter cylinders by butt welding a plurality of metal plates together along their longitudinally extending edges, the edges being beveled preparatory to welding. Heretofore, however, such cylinder construction has been accomplished by first individually rolling each of the component plates and subsequently welding the curved plates together into a cylinder. Welding the precurved plates in this manner often causes distortion of the finished cylinder, however. The stresses developed are prone to throwing the cylinder out of round.

In addition, the seams between the curved plates are conventionally welded from both inside and outside the assembled cylinder. Welding the seams both inside and outside the cylinder is ordinarily considered necessary to assure fluid tight seams since one side welding of seams on a curved surface such as a cylinder, for example, is often unsatisfactory because of the welding techniques necessarily employed. However, in accordance with the method disclosed and claimed in the copending application of Columbus Floyd et al., entitled Welding Method and Apparatus, Serial No. 184,968, filed April 4, 1962, and assigned to the same assignee as the present invention, curved plates may be joined by welding from one side only.

Cylinders manufactured in the conventional manner are frequently used as aqueduct pipes, for example. As such, they are ordinarily lined with concrete or the like by conventional lining methods. Since a relatively large weld bead is generally developed by internal welding of the seams in the cylinder, it is not uncommon for an undesirable longitudinally extending ridge to be formed on the surface of the concrete or the like forming the lining.

Furthermore, of course, large diameter cylinders ordinarily are subjected to constant strain under heavy load stresses. Because the internal weld beads on the cylinder resulting from conventional welding techniques are generally larger than the external weld beads, such strains exert substantially high stresses in the beads and consequently there is a tendency for seam leaks to develop.

On the other hand, the method embodying the features of the present invention produces cylinders having a sounder, more uniformly round and fluid tight construction. This in addition, of course, to the fact that the present method is simpler, faster, and less expensive than generally comparable methods presently utilized. This method constitutes a radical departure from and a substantial improvement over presently known methods of construction.

The present method (like known methods of manufacturing cylinders) begins with a basic building block of such a cylinder, a flat metal plate 11 (seen in FIGURE 2). Here the similarity of the present method to known methods ends, however. The plate 11 might be steel plate of a prescribed thickness, depending upon the size and prospective utilization of the finished cylinder. In practice, for example, it is not uncommon to manufacture cylinders exceeding eight feet in diameter and, of course, relatively heavy plate must be utilized in such cases. At any rate, a plurality of plates 11 are initially stored in individual stacks, as seen generally at 20 in FIGURE 3.

The initial manufacturing step in the method embodying the features of the present invention is squaring off a predetermined number of flat plates 11 to form substantially perfect rectangles. This is accomplished by a shear 21 (see FIGURE 3) to which individual plates 11 are brought by an overhead plate handler, seen generally at 22, mounted for travel on a conventional track arrangement 24. Substantially perfect rectangles are necessary, of course, to assure proper mating of the adjoining longitudinally extending edges of the plates when a plurality of the plates are welded togther to form the cylinder 10.

The overhead plate handler 22 comprises an operator's compartment 30 suspended from a suitable framework 31, and a plate carrying unit 32 suspended from a suitable framework 33 adjacent the framework 31. The plate carrying unit 32 includes a plurality of pneumatic suction cups 35 of relatively large diameter adapted to engage and hold the plates 11 for transport from the storage stacks 20 to the shear 21. A partial vacuum is established and maintained in the suction cups 35 by pneumatic means of conventional construction (not shown) incorporated in the unit 32 and operated from the operator's compartment 30 by a conventional remote control means (not shown).

As has been pointed out, the shear 21 squares off the plates 11 to form substantially perfect rectangles. This squaring off is accomplished by initially shearing one longitudinally extending edge of the plate 11 which extends onto the shear bed 40 beneath the shear blade 41 and then using the sheared off side as a reference from which the ends and the other longitudinally extending edge of the plate 11 are squared. Specifically, one of the longitudinally extending edges of the plate 11 is sheared. The plate 11 is then turned 90° by the plate handler 22 and an end thereof sheared. The plate 11 is then turned 90° again, forced against guide stops (not shown) and the other longitudinal edge cut to the exact size. After another 90° turn the plate 11 is pressed against different positioning stops and the other end of the plate 11 is cut to exact size. These positioning stops are normally recessed in the shear bed and are automatically raised when they are to be used.

The next step in the operation involves welding a plurality of the plates 11 (three in this case) togther to form a single plate of a size susceptible to being rolled into a substantially large cylinder. As each of the flat plates 11 is squared off, it is picked up once more by the overhead plate handler 22 and moved onto a seam welding unit, seen generally at 45, to accomplish this welding. When three plates 11 have been placed side by side on the table 46 of the welding unit 45, the unit 45 is motivated to simultaneously or separately weld both seams 12 between the adjoining plates 11 along one side of the plates to form a composite plate 50. Welding the seams 12 along one side of the plates 11 is preferably accomplished by the method disclosed and claimed in the aforementioned copending application of Columbus Floyd et al.

By welding the seams 12 in this manner from only one side of the plates 11, relatively large beads 51 (see FIGURE 1) are formed on the upper side of the plate 50 while substantially small beads 52 (see FIGURE 1 also) are formed on the bottom of the plates 11. This welding is perferably accomplished by a welding head assembly 60 of the type disclosed in the aforementioned copending application, in conjunction with cooling back-up bars 61 formed in the table 46 of the welding unit 45 and underlying the seams 12 between the adjacent metal plates 11. When the cylinder is formed, the smaller beads 52 are on the inside, obviating distortion of any lining subsequently applied to the cylinder 10.

After the plates 11 have been welded into the composite plate 50 in the manner hereinbefore described, the composite plate 50 is moved, preferably on rollers or the like (not shown), onto a sandwich type plate turner unit, seen generally at 65, to be flipped over so that the relatively large beads 51 are on the bottom of the composite plate 50 and the relatively smaller beads 52 are on the top. This is accomplished by sliding the composite plate 50 onto one bed 70 of the turner unit 65 while a hinged cooperating bed 71 is raised into the position as seen in FIGURE 3. The cooperating bed 71 is then folded down over the composite plate 50 to clasp the plate 50 between the beds 70 and 71, after which the beds are pinned together in any well known manner. The sandwich arrangement of the beds 70 and 71 and the composite plate 50 is then pivoted about floor hanged mountings 73 so that the cooperating bed 71 is on the bottom, the bed 70 is on the top, and the composite plate 50 is in inverted relationship. The bed 70 is raised and the inverted composite plate 50 moved outwardly of the turner unit 65 in the direction of the arrow 80 in FIGURE 3.

After the composite plate 50 has been inverted in the manner hereinbefore described, it is preferably moved by an overhead crane of conventional construction having vacuum cups to a crimping unit, seen diagrammatically at 85, FIGURE 4, where the longitudinally extending free edges 86 and 87 of the composite plate 50 are crimped into arcs having radii of curvature corresponding to the prospective radius of the finished cylinder 10. This crimping or "precurving" of the free edges 86 and 87 of the composite plate 50 is necessary since the conventional rolling operation to which the composite plate 50 is subsequently subjected in order to form it into a cylinder is generally not, in itself, effective to curve the free edges 86 and 87 sufficiently. This is true of virtually all rolling operations of the type wherein sheet or plate is rolled into arcuate or cylindrical form and, in virtually all such instances, crimping of the longitudinally extending edges of the plate being rolled is necessary.

Of course, it will be seen that in the method embodying the features of the present invention, only two longitudinally extending free edges need to crimped, that is the edges 86 and 87. This is not true, however, of the known cylinder manufacturing methods wherein the individual component plates are rolled before being assembled and welded into a cylinder. In such case, it will be obvious that each free edge of each individual plate must be crimped to obtain the proper radius of curvature across the entire width of the plate. Where the cylinder is comprised of three plates, it will be seen that separate crimping operations must be accompanied on six edges, for example, as opposed to the necessity of only crimping two edges to prepare the composite plate 50 of the applicants' invention for rolling into cylindrical form. A great saving in time and labor results from the elimination of a great number of crimping operations.

Turning now to FIGURE 5, the crimped composite plate 50 is next transported by any well known means to conventional pyramid rolls, seen generally at 90, where the plate is formed into a cylindrical shape. The composite plate 50 might be transported to the rolls 90 by an inclined table, for example, the means employed supporting and guiding the composite plate 50 as it enters the rolls 90.

The pyramid rolls 90, which include a lower pair of spaced outside rolls 95 and 96 and an intermediate upper roll 97, receives the plate 50 with its longitudinally extending free edges 86 and 87 curved upwardly and works the composite plate 50 into cylindrical form in the manner shown. At the completion of this rolling operation, the composite plate 50 has acquired a substantially circular cross section and the longitudinally extending free edges 86 and 87 thereof are in immediately adjacent relationship, flush with each other.

After the longitudinally extending free edges 86 and 87 of the composite plate 50 have been brought into immediately adjacent relationship, the as yet unfinished cylinder is drawn off the rolls 90 and placed onto a waiting area consisting of a series of conveyor rolls seen generally at 100, by conventional means such as a cable and pulley arrangement (not shown), for example. If the rolls are putting out more unfinished cylinders than the subsequent closing seam operation can handle, the unfinished cylinders, which will hereinafter be identified in each instance by the reference numeral 104, are then preferably moved from the conveyor rolls 100 into an unfinished cylinder storage area 105 adjacent the conveyor rolls 100.

At this stage, of course, the unfinished cylinders 104 are ready for a welding operation which closes the seam between the longtiudinally extending free edges 86 and 87 of the plate 50. To accomplish this end, an unfinished cylinder 104 is taken from the storage area 105 and placed on the conveyor rolls 100 by any conventional means such as an overhead crane, for example. The unfinished cylinder 104 is then moved to the right, in FIGURE 5, onto a transfer car, seen generally at 110 in FIGURES 6 and 7, which in turn trasfers the unfinished cylinder 104 onto a closing seam welder 112. The closing seam welder 112 is adapted, of course, to close the open seam between the adjacent free edges 86 and 87 of the composite plate 50 and thus produce a completed cylinder 10.

In order to assure a continuous and unimpeded flow of unfinished cylinders 104 from the storage area 105 to the closing seam welder 112, and a similar unimpeded flow of the finished cylinders 10 from the closing seam welder 112 to a storage area 125 (see FIGURE 5) for the finished cylinders, a specific sequence of movement of the cylinders is accomplished in the present method. Initially, an unfinished cylinder 104 is rolled directly onto the transfer car 110 from the conveyor rolls 100. The transfer car is preferably constructed in a manner disclosed and claimed in the copending application of Frank P. Albert et al., entitled Transfer Car, Serial No. 185,005, filed April 4, 1962, and assigned to the same assignee as the present invention. Transfer car 110 is capable of carrying two cylinders, either finished cylinders 10 or unfinished cylinders 104, as a matter of choice, as will readily be seen, and is adapted to move transversely of the closing seam welder 112 on rails 115. In this manner, either of a pair of cylinder seats 116 or 117 on the transfer car 110 is readily brought into alignment with the closing seam welder 112. Spherical rollers 118 in each of the cylinder seats 116 and 117 are adapted to support the unfinished cylinders 104 or the finished cylinders 10 for easy longitudinal movement of the transfer car 110 onto and off of the conveyor rolls 100 and onto and off of the closing seam welder 112.

Initially, two of the unfinished cylinders 104 are moved onto the transfer car 110 and seated in the cylinder seats 116 and 117. The transfer car is then moved into a position wherein one of the unfinished cylinders 104 is in alignment with the closing seam welder 112 and this cylinder 104 is then drawn by any conventional means such as a cable and winch, for example, onto the closing seamer 112, as seen in FIGURE 7. After the closing seamer 112 has closed the final seam between the longitudinally extending free edges 86 and 87 of the plate 50, the finished cylinder 10 is pulled off the seamer 112 onto the seat 116 of the transfer car 110 from which it was removed to the storage area, seen generally at 125.

While the finished cylinder 10 is being returned to the storage area 125, the transfer car 110 is moved into position such that the unfinished cylinder 104 seated in the seat 117 on the transfer car 110 can readily be slid onto the closing seamer 112 for final welding. Thus, while the cylinder 10, which has just been welded, is being moved back into the storage area 125, the closing seamer 112 does not sit idle but receives the unfinished cylinder 104 which remains on the seat 117 of the transfer car 110. While this last mentioned unfinished cylinder 104 is having the seam between its longitudinally extending free edges 86 and 87 welded, plenty of time is available to bring up another unfinished cylinder 104 from the storage area 105, via the conveyor rolls 100, into the seat 116 or 117 on the transfer car 110. This sequence of movement of the cylinders 10 and 104 is repeated indefinitely, of course, or until the prescribed number of unfinished cylinders 104 have been welded to produce finished cylinders 10.

The closing seamer 112 is adapted to automatically weld the final seam formed between the longitudinally extending free edges 86 and 87 of the composite plate 50, from the outside of the cylinder 10 being completed. This welding operation is similar to that employed to weld the flat plates 11 together. The closing seamer 112 includes two tandem welding heads 130 supported for longitudinal movement on a welding carriage mounted on a track 131. The welding carriage is adapted to move the welding heads 130 along the seam between these free edges 86 and 87 at a predetermined rate to establish a finished weld along the seam.

While an unfinished cylinder 104 is being welded in the aforedescribed manner, it is maintained in a predetermined relationship with the welding heads 130 by a plurality of air operated arms 132 pivotally mounted on posts 133 provided along the side of the cylinder 104. Power for the closing seamer 112 is derived from a conventional power unit 134.

As has been pointed out, once an unfinished cylinder 104 has been finish welded by the seamer 112 to produce a finished cylinder 10, it is returned to the storage area 125. Subsequently, the cylinders 10 are usually pressure tested for fluid leaks in any well known manner. An expander (not shown) might then expand one end of a cylinder 10 to facilitate overlapping of the appropriate ends of a series of such cylinders necessary in the construction of an aqueduct pipe, for example.

When the cylinders 10 are to be used as aqueduct pipes, for example, it is conventional, as has been pointed out, to line them with concrete or the like. This is ordinarily accomplished by one of a number of well known lining processes. A commonly used process is a spray type operation in which concrete is literally thrown onto the internal wall of the cylinder by equipment of well known construction. Since the internal weld beads 52 in the cylinders 10 manufactured by the method embodying the features of the present invention are relatively small, no recognizable ridge is formed along the inside of the cylinders in the surface of the concrete and consequently a smooth internal configuration is assured. This is, of course, a great improvement over lined pipe constructions heretofore known where relatively prominent ridges normally remain in the lining because of relatively large internal weld beads.

It will readily be seen that the method embodying the features of the present invention is substantially simpler, requires less time and labor, and is consequently considerably less expensive than generally similar methods presently utilized for manufacturing large diameter cylinders. In this light, only one rolling operation on a single, composite plate, need be performed, as opposed to the individual rolling of three or more separate plates in known methods of cylinder manufacture. In a similar manner, the number of crimping operations on the edges of the plate is greatly reduced, since obviously a composite plate has only two edges while a plurality of plates has twice as many free longitudinally extending edges as the number of plates. Prior to the development of the present method, each individual plate had to be crimped along both of its longitudinally extending edges.

The overhead plate handler arrangement employing suction cups for carrying the component plates through the individual operations of the method in question facilitate rapid handling of these plates with a minimum of effort. As a consequence, the elapsed manufacturing time for each cylinder is further reduced.

Additional elapsed manufacturing time is saved through the novel arrangement and utilization of the unfinished cylinder storage areas 105 and 125, the conveyor rolls 100, the transfer car 110, and the closing seamer 112. As has been carefully described, the flow of unfinished cylinders 104 to the closing seamer 112 and the flow of finished cylinders 10 therefrom is unimpeded due to the unique manner in which the cylinder handling is effected, and consequently substantial time savings are assured.

In addition to time and labor savings which effect decreased costs, a cylinder 10 manufactured by the present method is rounder, has a sounder construction, and is generally superior in physical characteristics to the cylinders manufactured by methods presently known. The presence of only relatively small weld beads within the cylinder permits the cylinder lining to be substantially smooth, as of course is desirable.

While an embodiment described herein is at present considered to be preferred, it is understood that various modifications and improvements may be made therein, and it is intended to cover in the appended claims all such modifications and improvements as fall within the true spirit and scope of the invention.

What is desired to be claimed and secured by Letters Patent of the United States is:

1. A method of manufacturing a cylinder from a plurality of substantially flat plates comprising the steps of placing the plates on a substantially flat surface in adjoining relationship so as to define a plurality of seams between the longitudinally extending edges of the plates, welding said plates together along said seams from the top of said plate so as to assemble a composite plate having relatively large weld beads on the top of said composite plate and relatively small weld beads on the bottom of said composite plate, turning said composite plate over so that the side of said composite plate having said smaller weld beads on it faces upwardly, crimping each longitudinally extending free edge of the composite plate upwardly into an arc having a radius corresponding to the prescribed radius of the finished cylinder, rolling said composite plate about a longitudinally extending axis until said free edges come into immediately adjacent relationship and an open seam is defined between said free edges, and welding said open seam from the outside of said rolled composite plate to form a cylinder having said relatively large weld beads on the outside of said cylinder.

2. A method of manufacturing a cylinder from a plurality of substantially flat plates comprising the steps of shearing the plurality of plates to establish substantially perfect rectangular plates, placing the rectangular plates on a substantially flat surface in adjoining relationship so as to define a plurality of seams between the longitudinally extending adjacent edges of said rectangular plates, welding said rectangular plates together along said seams so as to assemble a composite plate having relatively large weld beads on the top of said composite plate and relatively small weld beads on the bottom of said composite plate, turning said composite plate over so that the side of said composite plate having said relatively large weld beads thereon is on the bottom, crimping each of the longitudinally extending free edges of said composite plate upwardly in an arc having a radius corresponding to the proposed radius of the cylinder, rolling said composite plate about a longitudinally extending axis until said free edges come into immediate adjacent relationship so as to define an open seam therebetween, and welding said open seam from the outside of said cylinder to complete said cylinder with said relatively small weld beads inside said cylinder.

3. A method of manufacturing a cylinder from a plurality of substantially flat plates comprising the steps of gripping a substantially flat plate with a suction device and moving it to a shear, shearing the substantially flat plate into a substantially perfectly rectangular plate, lifting said substantially perfectly rectangular plate with said sucion device and moving it onto a substantially flat surface, lifting, moving, and shearing a predetermined additional number of plates to form substantially perfectly rectangular plates, and placing these additional substantially perfectly rectangular plates on said substantially flat surface in adjoining relationship with said first mentioned substantially perfectly rectangular plate so as to define a plurality of seams between the longitudinally extending edges of said substantially perfectly rectangular plates, welding said rectangular plates together along said seams from the top of said rectangular plates to as to assemble a composite plate having relatively large weld beads on the top of the composite plate and relatively small weld beads on the bottom of the composite plate, turning said composite plate over so that the side of said composite plate having said relatively large weld beads thereon is on the bottom, crimping each of the longitudinally extending free edges of said composite plate upwardly in an arc having a radius corresponding to the proposed radius of the cylinder, rolling said composite plate about a longitudinally extending axis to bring the longitudinally extending free edges of the composite plate into adjacent relationship, and welding the seam formed between said free edges to form a cylinder having said relatively large weld beads on the outside of the cylinder.

4. A method of manufacturing a cylinder from a plurality of substantially flat plates comprising the steps of gripping a substantially flat plate with a suction device and moving it to a shear, shearing the substantially flat plate into a substantially perfectly rectangular plate, lifting said substantially perfectly rectangular plate with said suction device and moving it onto a substantially flat surface, lifting, moving, and shearing a predetermined additional number of plates to form substantially perfectly rectangular plates, and placing these additional substantially perfectly rectangular plates on said substantially flat surface in adjoining relationship with said first mentioned substantially perfectly rectangular plate so as to define a plurality of seams between the longitudinally extending edges of said plates, welding said rectangular plates together along said seams from the top of said plates so as to assemble a composite plate having relatively large weld beads on the top of the composite plate and relatively small weld beads on the bottom of the composite plate, turning said composite plate over so that the side of said composite plate having said relatively large weld beads thereon is on the bottom, crimping each of the longitudinally extending free edges of said composite plate upwardly in an arc having a radius corresponding to the proposed radius of the cylinder, rolling said composite plate about a longitudinally extending axis to bring the longitudinally extending free edges of the composite plate into adjacent relationship and form a partially finished cylinder, moving said partially finished cylinder to an appropriate storage area until a plurality of partially finished cylinders have been assembled in said storage area, moving a first and second partially finished cylinder onto a transfer car which may be positioned to deliver either of said first and second cylinders to a finished seam welder, transferring said first partially finished cylinder to said finish seam welder and welding the seam defined between the longitudinally extending free edges of said first partially finished cylinder to form a first finished cylinder having said relatively large weld beads on the outside of the cylinder, removing said first finished cylinder from said finish seam welder onto said car, moving said car into position to facilitate transfer of said second partially finished cylinder onto said seam welder and transferring said second partially finished cylinder onto said seam welder, returning said firt finished cylinder to a finished cylinder storage area and bringing a third partially finished cylinder from said partially finished cylinder storage area onto said transfer car while said second partially finished cylinder is being welded to form a second finished cylinder, removing said second finished cylinder from said finish seam welder, transferring said third partially finished cylinder onto said finish seam welder, and repeating the foregoing sequence until a predetermined number of partially finished cylinders have been finish-welded.

References Cited in the file of this patent
UNITED STATES PATENTS

| | | |
|---|---|---|
| 1,491,176 | Smith | Apr. 22, 1924 |
| 1,840,305 | Andrus et al. | Jan. 12, 1932 |
| 1,847,310 | Schmitz | Mar. 1, 1932 |
| 1,931,162 | Kranz et al. | Oct. 17, 1933 |
| 1,978,685 | Mogford et al. | Oct. 30, 1934 |
| 1,991,556 | Hopkins | Feb. 19, 1935 |
| 2,416,173 | Halstead | Feb. 18, 1947 |

UNITED STATES PATENT OFFICE
CERTIFICATE OF CORRECTION

Patent No. 3,159,911                        December 8, 1964

Frank P. Albert et al.

It is hereby certified that error appears in the above numbered patent requiring correction and that the said Letters Patent should read as corrected below.

Column 1, line 39, for "proivde" read -- provide --; column 3, lines 41 and 74, for "togther", each occurrence, read -- together --; column 4, line 41, for "hanged" read -- hinged --; column 5, line 2, for "accompanied" read -- accomplished --; line 43, for "longtiudinally" read -- longitudinally --; line 49, for "trasfers" read -- transfers --; column 8, line 29, for "sucion" read -- suction --; column 10, line 1, for "firt" read -- first --.

Signed and sealed this 27th day of April 1965.

(SEAL)
Attest:

ERNEST W. SWIDER                            EDWARD J. BRENNER
Attesting Officer                                Commissioner of Patents